(12) United States Patent
Wang

(10) Patent No.: US 10,659,599 B2
(45) Date of Patent: *May 19, 2020

(54) CERTIFICATE LOADING METHOD AND RELATED PRODUCT

(71) Applicant: GUANGDONG OPPO MOBILE TELECOMMUNICATIONS CORP., LTD., Dongguan, Guangdong (CN)

(72) Inventor: Jian Wang, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/532,042

(22) Filed: Aug. 5, 2019

(65) Prior Publication Data

US 2019/0364147 A1 Nov. 28, 2019

Related U.S. Application Data

(63) Continuation of application No. 16/110,886, filed on Aug. 23, 2018, now Pat. No. 10,419,599.

(30) Foreign Application Priority Data

Oct. 11, 2017 (CN) .......................... 2017 1 0941771

(51) Int. Cl.
*G06F 21/51* (2013.01)
*H04M 1/725* (2006.01)
(Continued)

(52) U.S. Cl.
CPC ........ *H04M 1/72577* (2013.01); *G06F 21/32* (2013.01); *G06F 21/51* (2013.01);
(Continued)

(58) Field of Classification Search
CPC .................................................. H04M 1/72577
(Continued)

(56) References Cited

U.S. PATENT DOCUMENTS

2014/0226173 A1  8/2014  Tredoux et al.
2016/0094348 A1  3/2016  Takahashi

FOREIGN PATENT DOCUMENTS

CN   101470783   7/2009
CN   102035849   4/2011
(Continued)

OTHER PUBLICATIONS

SIPO, Notice of Completion of Formalities for Patent Register for CN Application No. 201710941771.4, dated Aug. 19, 2019.

*Primary Examiner* — Joel Ajayi
(74) *Attorney, Agent, or Firm* — Hodgson Russ LLP

(57) ABSTRACT

Embodiments of the present disclosure provide a certificate loading method and related products. The method includes: detecting a first process requesting to call a target data processing algorithm, and determining a certificate corresponding to the target data processing algorithm, the target data processing algorithm being one of a plurality of data processing algorithms associated with a currently launched face recognition application; obtaining a set of process names associated with the certificate; detecting that the set of process names comprises a process name of the first process, and loading the certificate to allow the first process to call the target data processing algorithms.

20 Claims, 4 Drawing Sheets

(51) Int. Cl.
  *G06F 21/62* (2013.01)
  *G06F 21/32* (2013.01)
  *G06K 9/00* (2006.01)
  *H04L 9/32* (2006.01)

(52) U.S. Cl.
  CPC ....... *G06F 21/629* (2013.01); *G06K 9/00228* (2013.01); *G06K 9/00268* (2013.01); *G06K 9/00288* (2013.01); *H04L 9/3268* (2013.01)

(58) Field of Classification Search
  USPC .............................................. 455/550.1, 411
  See application file for complete search history.

(56) References Cited

FOREIGN PATENT DOCUMENTS

| | | |
|---|---|---|
| CN | 104092599 | 10/2014 |
| CN | 104376270 | 2/2015 |
| CN | 104992091 | 10/2015 |
| CN | 105243311 | 1/2016 |
| CN | 105260663 | 1/2016 |
| CN | 106790237 | 5/2017 |
| WO | 2012129639 | 10/2012 |

CERTIFICATE LOADING METHOD AND RELATED PRODUCT

CROSS-REFERENCE TO RELATED APPLICATIONS

This application is a continuation of U.S. patent application Ser. No. 16/110,886, filed Aug. 23, 2018, which claims priority to Chinese Patent Application No. 201710941771.4, filed Oct. 11, 2017. The entire disclosures of the aforementioned patent applications are incorporated by reference herein.

FIELD

The present disclosure relates to a mobile terminal technology field, and more particularly to a certificate loading method and related products.

BACKGROUND

With the popularization of smart phones, the smart phones can support more and more applications and have increasingly powerful functions. The smart phones are developing towards diversification and personalization, and become a necessary product in people's life.

At present, with higher and higher demand to security of the smart phones, a plurality of unlocking mechanisms using biological information, for example fingerprint recognition, face recognition and iris recognition, are proposed. The face recognition has a faster unlocking speed and a higher recognition success rate, and thus has become the first choice of most smart phones.

DISCLOSURE

Embodiments of the present disclosure provide a certificate loading method and related products.

Embodiments of the present disclosure provide a mobile terminal. The mobile terminal includes a processor, and a face image collection device and a memory connected to the processor. The face image collection device is configured to collect face images. The memory is configured to store a target data processing algorithm and a certificate corresponding to the target data processing algorithm. The processor is configured to carry out following actions, including detecting a first process requesting to call the target data processing algorithm, determining the certificate corresponding to the target data processing algorithm, the target data processing algorithm being one of a plurality of data processing algorithms associated with a currently launched face recognition application, obtaining a set of process names associated with the certificate, to detect that the set of process names includes a process name of the first process, and loading the certificate to allow the first process to call the target data processing algorithm.

Embodiments of the present disclosure provide a method for loading a certificate. The method includes: detecting a first process requesting to call a target data processing algorithm, and determining a certificate corresponding to the target data processing algorithm, the target data processing algorithm being one of a plurality of data processing algorithms associated with a currently launched face recognition application; obtaining a set of process names associated with the certificate; detecting that the set of process names includes a process name of the first process, and loading the certificate to allow the first process to call the target data processing algorithms.

Embodiments of the present disclosure provide a non-transitory computer readable storage medium. The computer readable storage medium stores computer programs for electronic data interchange, wherein the computer programs are configured to cause a computer to execute part or all of operations described in any method described above, and the computer comprises a mobile terminal.

BRIEF DESCRIPTION OF THE DRAWINGS

In order to explain technical solutions in embodiments of the present disclosure or in the related art clearly, drawings required to be used in the description of embodiment or the related art will be illustrated briefly in the following. Obviously, the drawings in the following description are merely some embodiments of the present disclosure, and those skilled in the art can obtain other drawings based on these drawings without creative labor.

EMBODIMENTS OF THE PRESENT DISCLOSURE

In order to make those skilled in the art understand technical solutions of the present disclosure better, the technical solutions of the present disclosure are described below completely and clearly with reference to drawings in embodiments of the present disclosure. Obviously, the embodiments described are merely some embodiments of the present disclosure, and are not all embodiments of the present disclosure. All other embodiments obtained by those skilled in the art based on the embodiments in the present disclosure without creative labor belong to the protection scope of the present disclosure.

Terms such as "first" and "second" in the specification, claims and drawings of the present disclosure are used to distinguish different objects, and are not used to describe specific order. In addition, terms "comprising" and "including" and their variations intend to cover non-exclusive inclusion. For example, a process, a method, a system, a product or a device including a series of operations or units is not limited to listed operations or units, but optionally further includes operations or units that have not been listed, or optionally further includes other operations or units inherent to the process, method, product or device.

"Embodiment" mentioned here means that, specific features, structures or characteristics described in combination with an embodiment can be included in at least one embodiment of the present disclosure. This word appeared at different positions of the specification does not intend to refer to the same embodiment, and does not refer to separate or alternative embodiment exclusive with other embodiments. Those skilled in the art explicitly or implicitly understand that, embodiments described here can be combined with other embodiments.

The mobile terminal involved in embodiments of the present disclosure may include various handheld devices, in-vehicle devices, wearable devices and computing devices having a wireless communication function or other processing devices connected to a wireless modem, and all kinds of user equipment, mobile stations and terminal devices, and the like. For convenience of description, all the devices mentioned above are collectively referred to as mobile terminals.

The mobile terminal described in embodiments of the present disclosure is provided with a face image collection device. The face image collection device may be a universal camera module, for example a front camera. Embodiments of the present disclosure are described in detail below.

Figure 1:
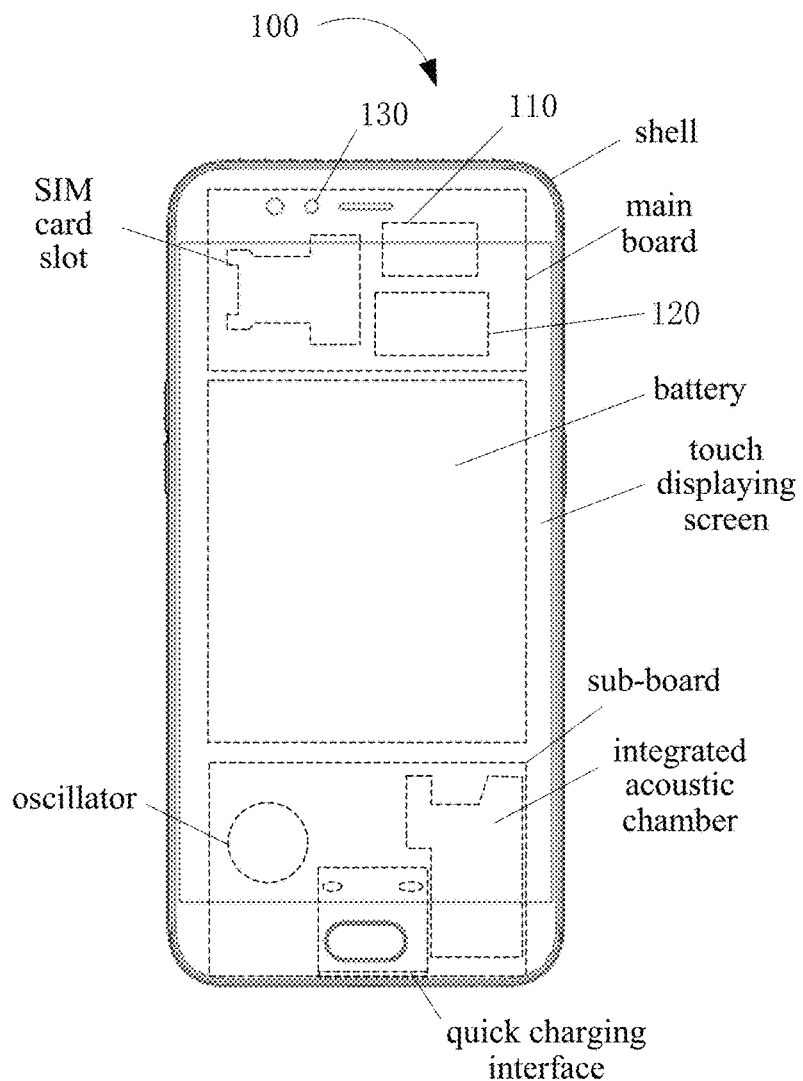
FIG. 1 is a schematic diagram illustrating a mobile terminal according to embodiments of the present disclosure.

Referring to FIG. 1, which is a schematic diagram of a mobile terminal 100 according to embodiments of the present disclosure, the mobile terminal 100 includes a shell, a touch displaying screen, a main board, a battery, and a sub-board. The main board is provided with a processor 110, a memory 120, a front camera 130 and a SIM card slot. The sub-board is provided with an oscillator, an integrated acoustic chamber, and a VOOC quick charge interface. The front camera 130 constitutes a face image collection device of the mobile terminal 100, and the face image collection device may include a camera.

The face image collection device 130 is configured to collect face images.

The memory 120 is configured to store a target data processing algorithm and a certificate corresponding to the target data processing algorithm.

The processor 110 is configured to detect a first process requesting to call the target data processing algorithm, to determine the certificate corresponding to the target data processing algorithm, the target data processing algorithm being one of a plurality of data processing algorithms associated with a currently launched face recognition application; to obtain a set of process names associated with the certificate; and to detect that the set of process names includes a process name of the first process, and load the certificate to launch the first process to call the target data processing algorithm.

The first process is a process of an application in the mobile terminal, in which the application includes a third-party application installed in the mobile terminal, or an installed system application, such as a payment application and a lock screen application, which is not limited here.

The target data processing algorithm at least includes an extraction algorithm of face feature data and a matching algorithm of face feature data, which is not limited here.

The certificate refers to an electronic tag or a random number pre-stored in the mobile terminal for verifying identity of a target object. For example, the target object may be the target data processing algorithm described above.

The certificate may be stored in a security system. When the mobile terminal calls the certificate, it needs to extract the certificate from the security system.

The processor 110 is a control center of the mobile terminal, which connects various parts of the mobile terminal via various interfaces and lines, and executes various functions of the mobile terminal and processes data by running or executing software programs and/or modules stored in the memory 120 and by calling data stored in the memory 120, so as to monitor the overall mobile terminal. Alternatively, the processor 110 can include an application processor and a modem processor, in which the application processor mainly processes the operating system, user interfaces, applications, and the like, the modem processor mainly processes wireless communication. It can be understood that, the modem processor may be not integrated into the processor 110.

The memory 120 may be configured to store software programs and modules. The processor 110 executes various function applications and data processing by running the software programs and module stored in the memory 120. The memory 120 can mainly include a program storage area and a data storage area, in which the program storage area can store the operating system, applications required by at least one function, and the like, the data storage area can store data created according to usage of the mobile terminal. In addition, the memory 120 may include a high speed random access memory, and may also include a non-transitory memory such as at least one disk storage device and a flash memory, or other transitory solid storage devices.

As can be seen, in embodiments of the present disclosure, when the mobile terminal detects the first process requesting to call the target data processing algorithm, the mobile terminal first determines the certificate corresponding to the target data processing algorithm, in which the target data processing algorithm is one of the plurality of data processing algorithms associated with the currently launched face recognition application, and then obtains the set of process names associated with the certificate, and finally loads the certificate to allow the first process to call the target data processing algorithm when detecting that the set of process names includes the process name of the first process. Since the face recognition application calls a third-party data processing algorithm during face recognition, security of the third-party data processing algorithm is very important. Therefore, by using the certificate authentication mechanism to ensure the security of calling the target data processing algorithm, it may avoid a case in which an illegal process calls the algorithm to crack the algorithm, which is advantageous to improve the security of face recognition performed by the mobile terminal.

In a possible example, with respect to loading the certificate to allow the first process to call the target data processing algorithm, the processor 110 is specifically configured to call the certificate to parse the target data processing algorithm in an encryption state, and process reference data associated with the first process by using the parsed target data processing algorithm.

As can be seen, in this example, based on the certificate authentication mechanism, the mobile terminal allows processing the reference data associated with the first process through the target data processing algorithm only when detecting that the first processing calling the target data processing algorithm has a legal identity, which is advantages to improve the security of face recognition performed by the mobile terminal.

In a possible example, before detecting the first process requesting to call the target data processing algorithm, the processor 110 is further configured to: detect a launching instruction of the face recognition application; verify that a signature certificate and an imported certificate of the face recognition application are identical; and launch the face recognition application.

As can be seen, in this example, the verification mechanism of the signature certificate and the imported certificate can effectively avoid changing the face recognition application, which is advantageous to improve the security of face recognition performed by the mobile terminal.

In a possible example, the processor 110 is further configured to: detect a boot event of the mobile terminal; import a plurality of certificates corresponding to the plurality of data processing algorithms associated with the face recognition application; and determine the set of process names associated with each certificate.

As can be seen, in this example, the mobile terminal can import the certificates corresponding to the data processing algorithms and determine the set of process names associated with each certificate at boot time, such that the mobile terminal does not need to import the certificates again during subsequent usage, improving authentication speed.

In a possible example, with respect to determining the set of process names associated with each certificate, the processor 110 is specifically configured to: determine the set of process names associated with each certificate according to the process name input by a current user; or determine the set of process names associated with each certificate by querying a preset mapping relationship between certificates and sets of process names.

As can be seen, in this example, the mobile terminal provides a flexible mechanism for determining the set of process names, which is advantageous to improve convenience and flexibility of setting the set of process names.

Figure 2A:
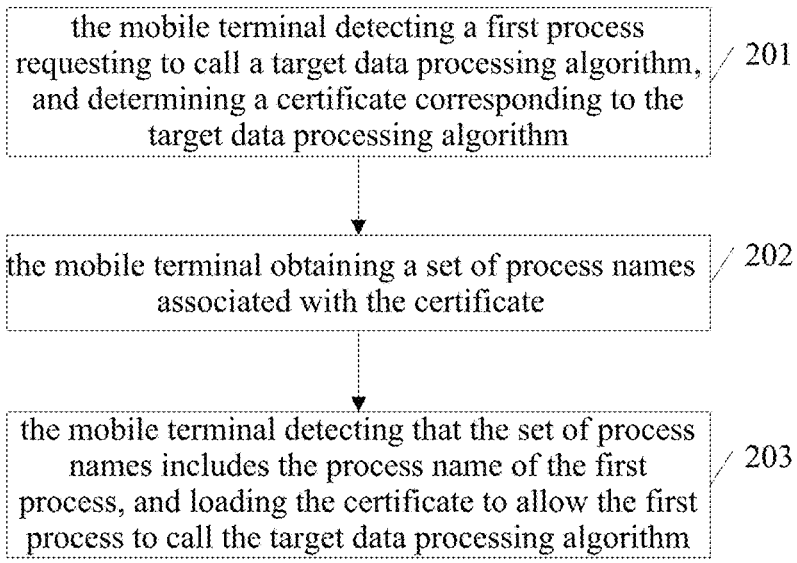
FIG. 2A is a flow chart of a method for loading a certificate according to an embodiment of the present disclosure.

Referring to FIG. 2A, which is a flow chart of a method for loading a certificate according to an embodiment of the present disclosure, the method for loading a certificate includes following operations.

At block 201, the mobile terminal detects a first process requesting to call a target data processing algorithm, and determines a certificate corresponding to the target data processing algorithm, in which the target data processing algorithm is one of a plurality of data processing algorithms associated with a currently launched face recognition application.

The first process is a process of an application in the mobile terminal, in which the application includes a third-party application installed in the mobile terminal, or an installed system application, such as a payment application and a lock screen application, which is not limited here.

The target data processing algorithm at least includes an extraction algorithm of face feature data and a matching algorithm of face feature data, which is not limited here.

The certificate refers to an electronic tag or a random number pre-stored in the mobile terminal for verifying identity of a target object. For example, the target object may be the target data processing algorithm described above.

Figure 2B:
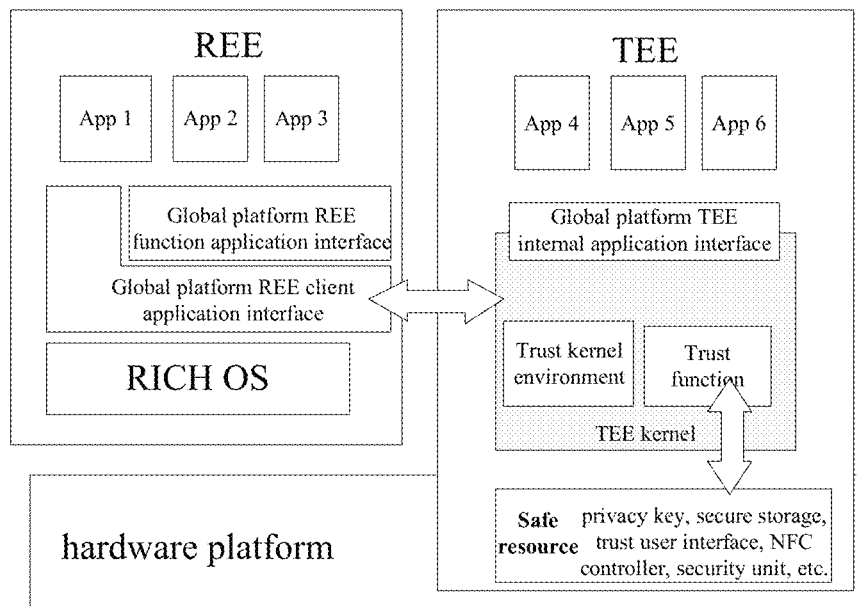
FIG. 2B is a schematic diagram illustrating interaction in a process of according to an embodiment of the present disclosure.

As illustrated in FIG. 2B, the mobile terminal runs REE (Rich Execution Environment) and TEE (Trust Execution Environment). TEE has its own execution space, that is, there is one operating system under TEE. TEE has a higher security level than Rich OS (normal operating system). Hardware and software resources accessible to TEE are separated from those accessible to Rich OS. TEE provides secure execution environment for TAs (Trust Applications), and also protects confidentiality, integrity and access authority of resources and data of TAs. In order to protect trusted root of TEE itself, TEE needs to be authenticated and separated from an operating system (such as Android system) during secure boot. In TEE, respective TAs are mutually independent, and cannot access to each other without authorization. The face recognition trusted application is a trust application in applications supported by TEE corresponding to the security system of the mobile terminal.

The certificate may be stored in the security system. When the mobile terminal calls the certificate, it needs to extract the certificate from the security system.

At block 202, the mobile terminal obtains a set of process names associated with the certificate.

At block 203, the mobile terminal detects that the set of process names includes a process name of the first process, and loads the certificate to allow the first process to call the target data processing algorithm.

As can be seen, in embodiments of the present disclosure, when the mobile terminal detects the first process requesting to call the target data processing algorithm, the mobile terminal first determines the certificate corresponding to the target data processing algorithm, in which the target data processing algorithm is one of the plurality of data processing algorithms associated with the currently launched face recognition application, and then obtains the set of process names associated with the certificate, and finally loads the certificate to allow the first process to call the target data processing algorithm when detecting that the set of process names includes the process name of the first process. Since the face recognition application calls a third-party data processing algorithm during face recognition, security of the third-party data processing algorithm is very important. Therefore, by using the certificate authentication mechanism to ensure the security of calling the target data processing algorithm, it may avoid a case in which an illegal process calls the algorithm to crack the algorithm, which is advantageous to improve the security of face recognition performed by the mobile terminal.

In a possible example, the mobile terminal loads the certificate to allow the first process to call the target data processing algorithm as follows. The mobile terminal calls the certificate to parse the target data processing algorithm in an encryption state, and processes reference data associated with the first process by using the parsed target data processing algorithm.

For example, the reference data associated with the first process may be face image data of the current user collected by the camera, and may also be face feature data in the fame image data, which is not limited here.

As can be seen, in this example, based on the certificate authentication mechanism, the mobile terminal allows processing the reference data associated with the first process through the target data processing algorithm only when detecting that the first processing calling the target data processing algorithm has a legal identity, which is advantages to improve the security of face recognition performed by the mobile terminal.

In a possible example, before the mobile terminal detects the first process requesting to call the target data processing algorithm, the method further includes: detecting a launching instruction of the face recognition application; verifying that a signature certificate and an imported certificate of the face recognition application are identical; and launching the face recognition application.

As can be seen, in this example, the verification mechanism of the signature certificate and the imported certificate can effectively avoid changing the face recognition application, which is advantageous to improve the security of face recognition performed by the mobile terminal.

In a possible example, the method further includes: detecting a boot event of the mobile terminal; importing a plurality of certificates corresponding to the plurality of data processing algorithms associated with the face recognition application; and determining the set of process names associated with each certificate.

As can be seen, in this example, the mobile terminal can import the certificates corresponding to the data processing algorithms and determine the set of process names associated with each certificate at boot time, such that the mobile terminal does not need to import the certificates again during subsequent usage, improving authentication speed.

In a possible example, the mobile terminal determines the set of process names associated with each certificate as follows. The mobile terminal determines the set of process names associated with each certificate according to the process name input by a current user; or the mobile terminal determines the set of process names associated with each certificate by querying a preset mapping relationship between certificates and sets of process names.

The preset mapping relationship between certificates and sets of process names may be issued by a server to the mobile terminal.

As can be seen, in this example, the mobile terminal provides a flexible mechanism for determining the set of process names, which is advantageous to improve convenience and flexibility of setting the set of process names.

Figure 3:
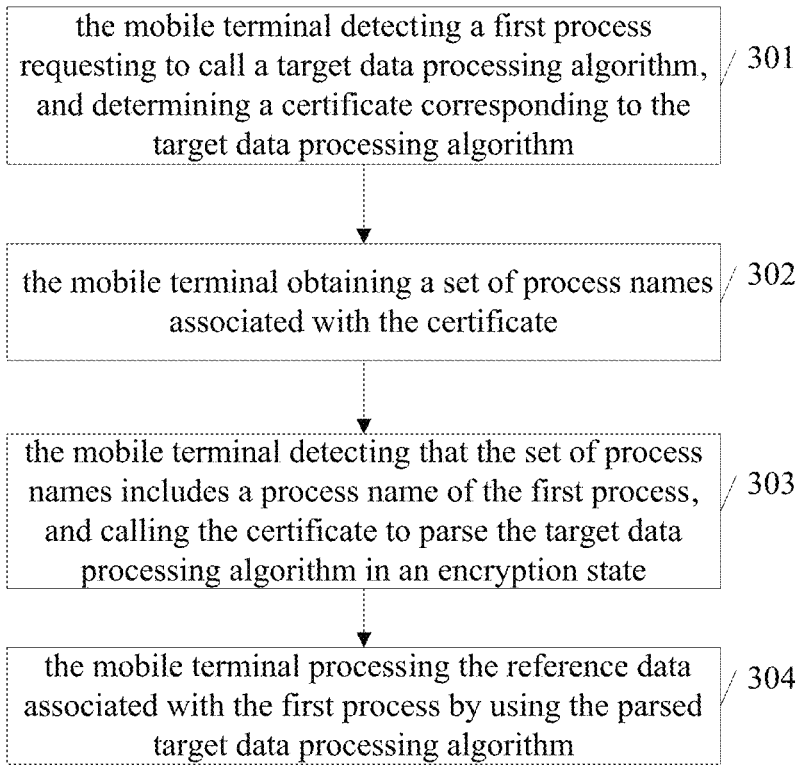
FIG. 3 is a flow chart of a method for loading a certificate according to another embodiment of the present disclosure.

Please refer to FIG. 3, which is a flow chart of a method for loading a certificate according to another embodiment of the present disclosure similar to the embodiment illustrated in FIG. 2A. The method is applied to a mobile terminal in which the operating system and the security system run. The face recognition service runs in the operating system, and the face recognition trusted application runs in the security system. As illustrated in FIG. 3, the method for loading a certificate includes following operations.

At block 301, the mobile terminal detects a first process requesting to call a target data processing algorithm, and determines a certificate corresponding to the target data processing algorithm, in which the target data processing algorithm is one of a plurality of data processing algorithms associated with a currently launched face recognition application.

At block 302, the mobile terminal obtains a set of process names associated with the certificate.

At block 303, the mobile terminal detects that the set of process names includes a process name of the first process, and calls the certificate to parse the target data processing algorithm in an encryption state.

At block 304, the mobile terminal processes the reference data associated with the first process by using the parsed target data processing algorithm.

As can be seen, in embodiments of the present disclosure, when the mobile terminal detects the first process requesting to call the target data processing algorithm, the mobile terminal first determines the certificate corresponding to the target data processing algorithm, in which the target data processing algorithm is one of the plurality of data processing algorithms associated with the currently launched face recognition application, and then obtains the set of process names associated with the certificate, and finally loads the certificate to allow the first process to call the target data processing algorithm when detecting that the set of process names includes the process name of the first process. Since the face recognition application calls a third-party data processing algorithm during face recognition, security of the third-party data processing algorithm is very important. Therefore, by using the certificate authentication mechanism to ensure the security of calling the target data processing algorithm, it may avoid a case in which an illegal process calls the algorithm to crack the algorithm, which is advantageous to improve the security of face recognition performed by the mobile terminal.

In addition, based on the certificate authentication mechanism, the mobile terminal allows processing the reference data associated with the first process through the target data processing algorithm only when detecting that the first processing calling the target data processing algorithm has a legal identity, which is advantages to improve the security of face recognition performed by the mobile terminal.

Figure 4:
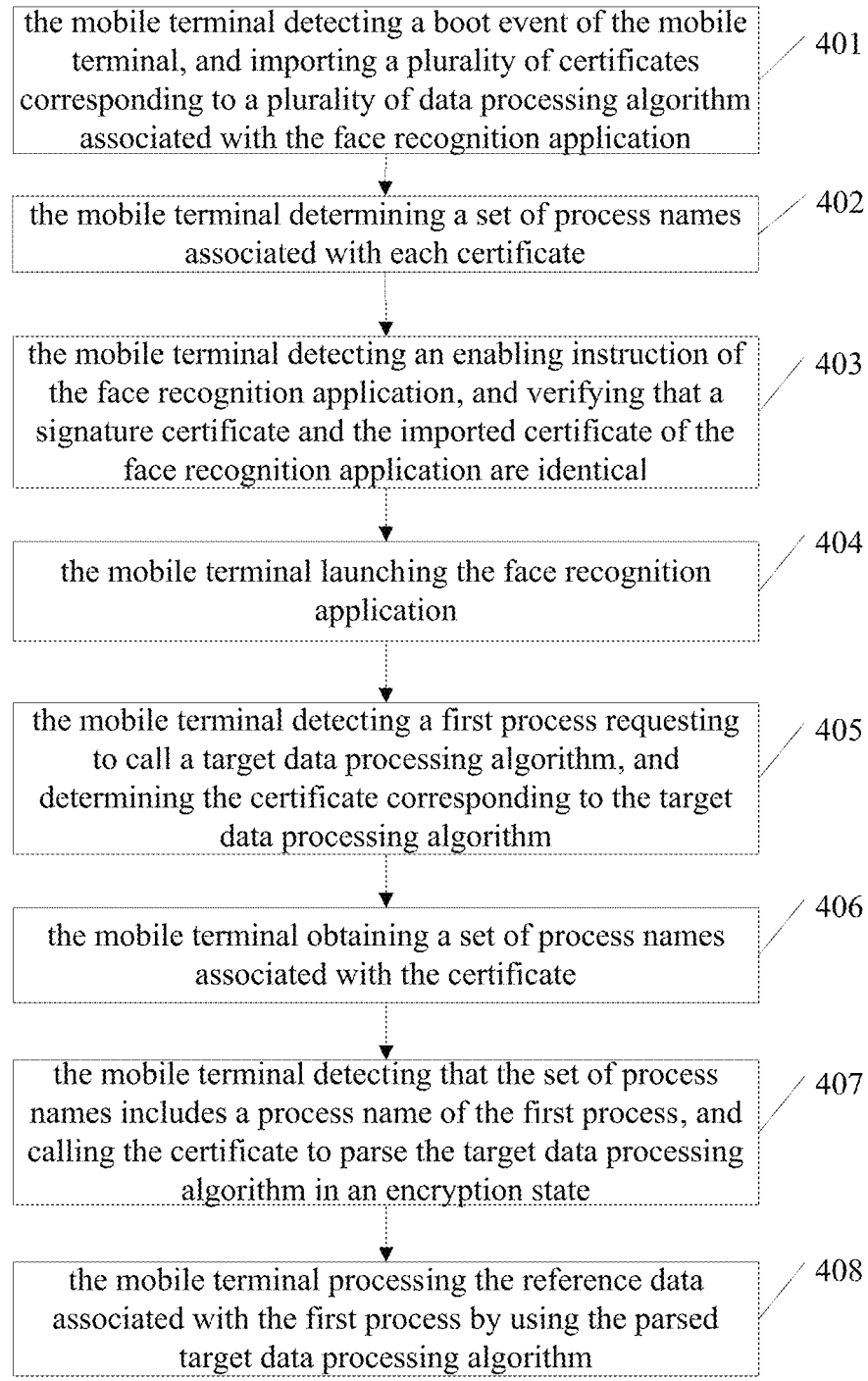
FIG. 4 is a flow chart of a method for loading a certificate according to another embodiment of the present disclosure.

Please refer to FIG. 4, which is a flow chart of a method for loading a certificate according to another embodiment of the present disclosure similar to the embodiment illustrated in FIG. 2A. The method is applied to a mobile terminal in which the operating system and the security system run. The face recognition service runs in the operating system, and the face recognition trusted application runs in the security system. As illustrated in FIG. 4, the method for loading a certificate includes following operations.

At block 401, the mobile terminal detects a boot event of the mobile terminal, and imports a plurality of certificates corresponding to a plurality of data processing algorithm associated with the face recognition application.

At block 402, the mobile terminal determines a set of process names associated with each certificate.

At block 403, the mobile terminal detects a launching instruction of the face recognition application, and verifies that a signature certificate and the imported certificate of the face recognition application are identical.

At block 404, the mobile terminal launches the face recognition application.

At block 405, the mobile terminal detects a first process requesting to call a target data processing algorithm, and determines the certificate corresponding to the target data processing algorithm, in which the target data processing algorithm is one of a plurality of data processing algorithms associated with a currently launched face recognition application.

At block 406, the mobile terminal obtains a set of process names associated with the certificate.

At block 407, the mobile terminal detects that the set of process names includes a process name of the first process, and calls the certificate to parse the target data processing algorithm in an encryption state.

At block 408, the mobile terminal processes the reference data associated with the first process by using the parsed target data processing algorithm.

As can be seen, in embodiments of the present disclosure, when the mobile terminal detects the first process requesting to call the target data processing algorithm, the mobile terminal first determines the certificate corresponding to the target data processing algorithm, in which the target data processing algorithm is one of the plurality of data processing algorithms associated with the currently launched face recognition application, and then obtains the set of process names associated with the certificate, and finally loads the certificate to allow the first process to call the target data processing algorithm when detecting that the set of process names includes the process name of the first process. Since the face recognition application calls a third-party data processing algorithm during face recognition, security of the third-party data processing algorithm is very important. Therefore, by using the certificate authentication mechanism to ensure the security of calling the target data processing algorithm, it may avoid a case in which an illegal process calls the algorithm to crack the algorithm, which is advantageous to improve the security of face recognition performed by the mobile terminal.

In addition, based on the certificate authentication mechanism, the mobile terminal allows processing the reference data associated with the first process through the target data processing algorithm only when detecting that the first processing calling the target data processing algorithm has a legal identity, which is advantages to improve the security of face recognition performed by the mobile terminal.

In addition, the verification mechanism of the signature certificate and the imported certificate can effectively avoid changing the face recognition application, which is advantageous to improve the security of face recognition performed by the mobile terminal.

In addition, the mobile terminal can import the certificates corresponding to the data processing algorithms and determine the set of process names associated with each certificate at boot time, such that the mobile terminal does not need to import the certificates again during subsequent usage, improving authentication speed.

In addition, the mobile terminal provides a flexible mechanism for determining the set of process names, which is advantageous to improve convenience and flexibility of setting the set of process names.

Figure 5:
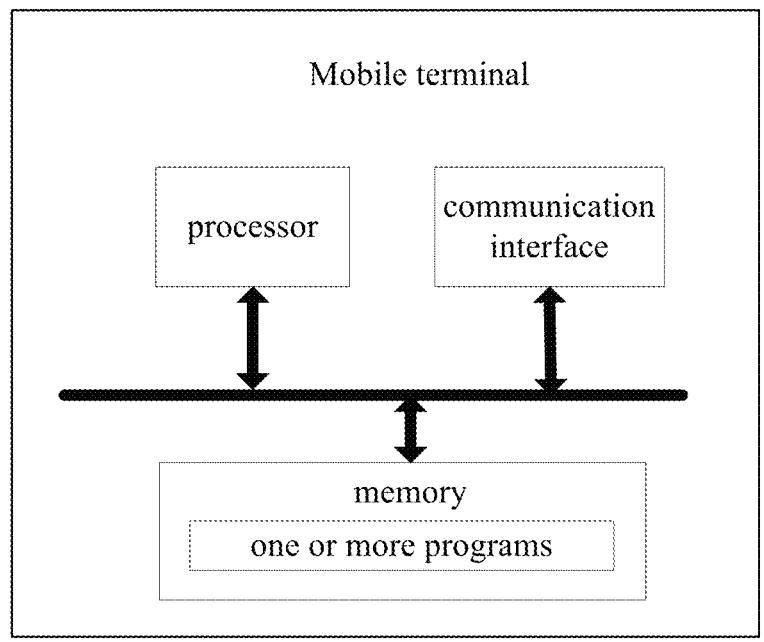
FIG. 5 is a schematic diagram of a mobile terminal according to an embodiment of the present disclosure.

Similarly to embodiments illustrated in FIGS. 2, 3 and 4, please refer to FIG. 5, which is a schematic diagram of a mobile terminal according to an embodiment of the present disclosure. As illustrated in FIG. 5, the mobile terminal includes a processor, a memory, a communication interface and one or more programs. The one or more programs are stored in the memory and configured to be executed by the processor. The programs include instructions configured to perform:

detecting a first process requesting to call a target data processing algorithm, and determining a certificate corresponding to the target data processing algorithm, the target data processing algorithm being one of a plurality of data processing algorithms associated with a currently launched face recognition application;

obtaining a set of process names associated with the certificate;

detecting that the set of process names includes a process name of the first process, and loading the certificate to allow the first process to call the target data processing algorithms.

As can be seen, in embodiments of the present disclosure, when the mobile terminal detects the first process requesting to call the target data processing algorithm, the mobile terminal first determines the certificate corresponding to the target data processing algorithm, in which the target data processing algorithm is one of the plurality of data processing algorithms associated with the currently launched face recognition application, and then obtains the set of process names associated with the certificate, and finally loads the certificate to allow the first process to call the target data processing algorithm when detecting that the set of process names includes the process name of the first process. Since the face recognition application calls a third-party data processing algorithm during face recognition, security of the third-party data processing algorithm is very important. Therefore, by using the certificate authentication mechanism to ensure the security of calling the target data processing algorithm, it may avoid a case in which an illegal process calls the algorithm to crack the algorithm, which is advantageous to improve the security of face recognition performed by the mobile terminal.

In a possible example, with respect to loading the certificate to allow the first process to call the target data processing algorithm, the instructions in the programs are configured to perform: calling the certificate to parse the target data processing algorithm in an encryption state, and processing reference data associated with the first process by using the parsed target data processing algorithm.

In a possible example, the programs further include instructions configured to perform: detecting a launching instruction of the face recognition application; verifying that a signature certificate and an imported certificate of the face recognition application are identical; and launching the face recognition application.

In a possible example, the programs further include instructions configured to perform: detecting a boot event of the mobile terminal; importing a plurality of certificates corresponding to the plurality of data processing algorithms associated with the face recognition application; and determining the set of process names associated with each certificate.

In a possible example, with respect to determining the set of process names associated with each certificate, the instructions in the programs are configured to perform: determining the set of process names associated with each certificate according to the process name input by a current user; or determining the set of process names associated with each certificate by querying a preset mapping relationship between certificates and sets of process names.

Figure 6:
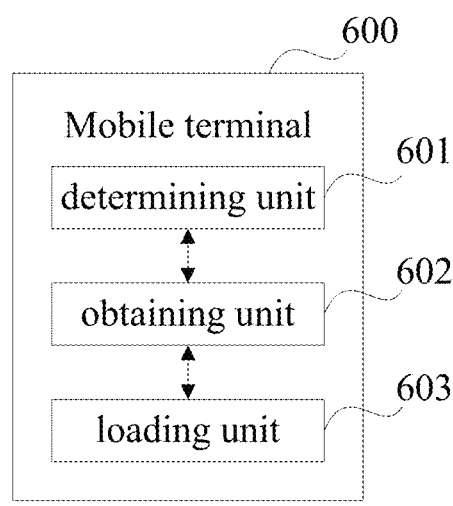
FIG. 6 is a block diagram illustrating functional units of a mobile terminal according to an embodiment of the present disclosure.

Similarly to the above embodiments, FIG. 6 is a block diagram illustrating functional units of a mobile terminal according to an embodiment of the present disclosure. The mobile terminal runs the operating system and security system, in which the face recognition service runs in the operating system, and the face recognition trusted application runs in the security system. The mobile terminal 600 includes a determining unit 601, an obtaining unit 602 and a loading unit 603.

The determining unit 601 is configured to detect a first process requesting to call the target data processing algorithm, and to determine the certificate corresponding to the target data processing algorithm, in which the target data processing algorithm is one of a plurality of data processing algorithms associated with a currently launched face recognition application.

The obtaining unit 602 is configured to obtain a set of process names associated with the certificate.

The loading unit 603 is configured to detect that the set of process names includes a process name of the first process, and load the certificate to launch the first process to call the target data processing algorithm.

As can be seen, in embodiments of the present disclosure, when the mobile terminal detects the first process requesting to call the target data processing algorithm, the mobile terminal first determines the certificate corresponding to the target data processing algorithm, in which the target data processing algorithm is one of the plurality of data processing algorithms associated with the currently launched face recognition application, and then obtains the set of process names associated with the certificate, and finally loads the certificate to allow the first process to call the target data processing algorithm when detecting that the set of process names includes the process name of the first process. Since the face recognition application calls a third-party data processing algorithm during face recognition, security of the third-party data processing algorithm is very important. Therefore, by using the certificate authentication mechanism to ensure the security of calling the target data processing algorithm, it may avoid a case in which an illegal process calls the algorithm to crack the algorithm, which is advantageous to improve the security of face recognition performed by the mobile terminal.

In a possible example, with respect to loading the certificate to allow the first process to call the target data processing algorithm, the loading unit 603 is specifically configured to call the certificate to parse the target data processing algorithm in an encryption state, and process reference data associated with the first process by using the parsed target data processing algorithm.

In a possible example, the mobile terminal further includes a verifying unit and a launching unit.

The verifying unit is configured to detect a launching instruction of the face recognition application and verify that a signature certificate and an imported certificate of the face recognition application are identical, before the determining unit 601 detects the first process requesting to call the target data processing algorithm.

The launching unit is configured to launch the face recognition application.

In a possible example, the mobile terminal further includes an importing unit.

The importing unit is configured to detect a boot event of the mobile terminal and import a plurality of certificates corresponding to the plurality of data processing algorithms associated with the face recognition application.

The determining unit 601 is further configured to determine the set of process names associated with each certificate.

In a possible example, with respect to determining the set of process names associated with each certificate, the determining unit 601 is specifically configured to: determine the set of process names associated with each certificate according to the process name input by a current user; or determine the set of process names associated with each certificate by querying a preset mapping relationship between certificates and sets of process names.

It is to be noted that, the mobile terminal described in device embodiments of the present disclosure are presented in a form of function units. The term "unit" used here should be taken in the broadest possible sense. Objects used for implementing functions described by respective "units" may for example be ASIC, separate circuits, a (shared, dedicated) processor (or chipset) used for executing one or more software or firmware programs and a memory, a combinational logic circuit, and/or other suitable components providing above functions.

The determining unit 601 and the loading unit 603 may be a processor or a controller, and the obtaining unit 602 may be a communication interface.

Embodiments of the present disclosure further provide a computer storage medium. The computer storage medium is stored with computer programs for electronic data interchange. The computer programs cause a computer to execute all or part of operations of any method disclosed in the method embodiments. The computer includes a mobile terminal.

Embodiments of the present disclosure further provide a computer program product. The computer program product includes a non-transitory computer readable storage medium stored with computer programs. The computer programs are operable to cause a computer to execute all or part of operations of any method described in the method embodiments. The computer program product may be a software installation package, and the computer includes a mobile terminal.

It is to be noted that, for the purpose of simple description, the foregoing respective method embodiments are expressed as a series of actions. However, those skilled in the art should appreciate that, the present disclosure is not limited by order of actions described, since depending on the present disclosure, certain actions may be executed in any other order or simultaneously. Secondly, those skilled in the art further should appreciate that, embodiments described in the specification belong to preferable embodiments, and the actions and modules involved may not be necessary for the present disclosure.

In above embodiments, description of respective embodiments has its own emphasis, and for parts not described in detail in a certain embodiment, reference may be made to the description of other embodiments.

In some embodiments provided by the present disclosure, it is to be understood that the disclosed apparatus may be implemented in other ways. For instance, the apparatus embodiments described above are exemplary, for example, the units are divided in terms of logical functions, and can be divided in other ways in actual implementation. For instance, a plurality of units or components may be combined or may be integrated into another system, or some features may be ignored, or may not be executed. In addition, the displayed or discussed mutual coupling or direct coupling or communication connection may be connected via some interfaces, indirect coupling or communication connection of the devices or units may be in an electrical form or in other forms.

The units described as separate parts may be or may not be physically separated, the components displayed as units may be or may not be physical units, that is, may be located in one place, or may be distributed on a purity of network units. Some or all of the units may be selected according to actual needs to achieve the objective of the solution of this embodiment.

In addition, respective function units in respective embodiments of the present disclosure can be integrated in one processing unit, or respective unit can also exist physically alone, or two or more units may be integrated in one unit. The foregoing integrated unit may be implemented either in hardware or software functional units.

If the integrated unit is implemented as a software functional unit and is sold or used as a stand-alone product, it may be stored in a computer readable storage medium. Based on this understanding, substantial parts or parts that contribute to the related art of the technical solution of the present disclosure or all or parts of the technical solution can be embodied in a form of software product. The computer software product is stored in a storage medium, and includes several instructions to enable a computer device (which may be a personal computer, a server or a network device and the like) to execute all or a part of steps of the methods according to respective embodiments of the present disclosure. The foregoing storage medium includes a U disk, a ROM (Read-Only Memory), a RAM (Random Access Memory), a mobile hard disk, a magnetic disk, an optical disk and other various mediums that may be store program codes.

Those skilled in the art should appreciate that all or part of operations in respective methods of the above embodiments may be implemented by programs instructing related hardware. The programs may be stored in a computer readable memory, and the memory may include a flash disk, a ROM, a RAM, a disk or an optical disk.

Although the present disclosure has been described in detail with reference to the foregoing embodiments, those skilled in the art should understand that, the technical solutions described in respective embodiments above may be modified, or some of technical features may be equivalently replaced; however, these modifications or replacements do not deviate the essence of the corresponding technical solutions from the scope of the technical solutions of embodiments of the present disclosure.

What is claimed is:

1. A mobile terminal, comprising:
   a memory;
   a face image collection device configured to collect face image information from a user, and store the face image information to the memory; and
   a processor, configured to carry out instructions stored on the memory to perform the following actions, comprising:
   detecting a boot event of the mobile terminal;
   importing a plurality of certificates corresponding to a plurality of data processing algorithms associated with a face recognition application of the face image collection device;
   determining a set of process names associated with each certificate;
   detecting a launching instruction of the face recognition application;
   detecting a first process requesting to call one of the plurality of data processing algorithms, the first process being one of processes of the launched face recognition application;
   determining the certificate of the one of the plurality of data processing algorithms;
   obtaining a set of processes associated with the determined certificate; and
   loading the determined certificate in response to the first process belongs to the set of processes associated with the determined certificate, such that the first process calls the data processing algorithm;
   calling the determined certificate to parse the data processing algorithm in an encryption state;
   processing reference data associated with the first process by using the parsed data processing algorithm; and
   launching the face recognition application.

2. The mobile terminal of claim 1, wherein launching the face recognition application, comprises:
   verifying whether a signature certificate of the face recognition application is identical to an imported certificate of the face recognition application, in response to the instruction; and
   launching the face recognition application, in response to that the signature certificate of the face recognition application is identical to the imported certificate of the face recognition application.

3. The mobile terminal of claim 1, wherein the memory is configured to store a set of processes associated with each certificate; and
   wherein obtaining the set of processes associated with the determined certificate, comprises: reading the set of processes associated with the determined certificate from the memory.

4. The mobile terminal of claim 1, wherein the processor is configured to carry out following actions, comprising:
   importing the plurality of data processing algorithms and the plurality of certificates corresponding to the plurality of data processing algorithms into the memory, upon receiving the boot event of the mobile terminal; and
   storing the set of processes associated with each certificate into the memory.

5. The mobile terminal of claim 4, wherein determining the set of processes associated with each certificate comprises:
   determining the set of processes associated with each certificate according to process names input by a current user.

6. The mobile terminal of claim 4, wherein determining the set of processes associated with each certificate comprises:
   determining the set of processes associated with each certificate by querying a preset mapping relationship between certificates and sets of processes.

7. The mobile terminal of claim 1, wherein loading the determined certificate, comprises:
   calling the determined certificate to decrypt the corresponding data processing algorithm; and
   processing reference data associated with the first process by using the decrypted data processing algorithm.

8. A method for loading a certificate, comprising:
   detecting a boot event of the mobile terminal;
   detecting a launching instruction of a face recognition application, the face recognition application configured to authenticate a user based upon face image information collected from an image collection device;
   importing a plurality of certificates corresponding to a plurality of data processing algorithms associated with the face recognition application of the face image collection device;
   determining a set of process names associated with each certificate;
   detecting a first process requesting to call one of a plurality of data processing algorithms, the first process being one of processes of the launched face recognition application;
   determining the certificate of the one of the plurality of data processing algorithms;
   obtaining a set of processes associated with the determined certificate; and
   loading the determined certificate in response to the first process belongs to the set of processes associated with the certificate, such that the first process calls the data processing algorithm;
   calling the determined certificate to parse the data processing algorithm in an encryption state;
   processing reference data associated with the first process by using the parsed data processing algorithm; and
   launching the face recognition application.

9. The method of claim 8, wherein launching the face recognition application, comprises:
   verifying whether a signature certificate of the face recognition application is identical to an imported certificate of the face recognition application, in response to the instruction; and
   launching the face recognition application, in response to that the signature certificate of the face recognition application is identical to the imported certificate of the face recognition application.

10. The method of claim 8, wherein obtaining the set of processes associated with the determined certificate, comprises:
    reading the set of processes associated with the determined certificate from a memory.

11. The method of claim 8, comprising:
    importing the plurality of data processing algorithms and a plurality of certificates corresponding to the plurality of data processing algorithms into a memory, upon receiving the boot event of a mobile terminal; and storing the set of processes associated with each certificate into a memory.

12. The method of claim 11, wherein determining the set of processes associated with each certificate comprises:
    determining the set of processes associated with each certificate according to process names input by a current user.

13. The method of claim 11, wherein determining the set of processes associated with each certificate comprises:
    determining the set of processes associated with each certificate by querying a preset mapping relationship between certificates and sets of processes.

14. The method of claim 8, wherein loading the determined certificate, comprises:
    calling the determined certificate to decrypt the corresponding data processing algorithm; and
    processing reference data associated with the first process by using the decrypted data processing algorithm.

15. A non-transitory computer readable storage medium, stored with computer programs for electronic data interchange, wherein the computer programs are configured to cause a computer to execute a method comprising:
    detecting a boot event of the mobile terminal;
    detecting a launching instruction of a face recognition application, the face recognition application configured to authenticate a user based upon face image information collected from an image collection device;
    determining a set of process names associated with each certificate;
    detecting a first process requesting to call one of a plurality of data processing algorithms, the first process being one of processes of the launched face recognition application;
    determining the certificate of the one of the plurality of data processing algorithms;
    obtaining a set of processes associated with the determined certificate; and
    loading the determined certificate in response to the first process belongs to the set of processes associated with the certificate, such that the first process calls the data processing algorithm;
    calling the determined certificate to parse the data processing algorithm in an encryption state;
    processing reference data associated with the first process by using the parsed data processing algorithm; and
    launching the face recognition application.

16. The non-transitory computer readable storage medium of claim 15, wherein launching the face recognition application, comprises:
    verifying whether a signature certificate of the face recognition application is identical to an imported certificate of the face recognition application, in response to the instruction; and
    launching the face recognition application, in response to that the signature certificate of the face recognition application is identical to the imported certificate of the face recognition application.

17. The non-transitory computer readable storage medium of claim 15, wherein obtaining the set of processes associated with the determined certificate, comprises:
    reading the set of processes associated with the determined certificate from a memory.

18. The non-transitory computer readable storage medium of claim 15, wherein the method comprises:
    importing the plurality of data processing algorithms and a plurality of certificates corresponding to the plurality of data processing algorithms into a memory, upon receiving the boot event of the computer; and
    storing the set of processes associated with each certificate into a memory.

19. The non-transitory computer readable storage medium of claim 18, wherein determining the set of processes associated with each certificate comprises:
    determining the set of processes associated with each certificate according to process names input by a current user, or
    determining the set of processes associated with each certificate by querying a preset mapping relationship between certificates and sets of processes.

20. The non-transitory computer readable storage medium of claim 15, wherein loading the determined certificate, comprises:
    calling the determined certificate to decrypt the corresponding data processing algorithm: and
    processing reference data associated with the first process by using the decrypted data processing algorithm.

* * * * *